(12) United States Patent
Chen et al.

(10) Patent No.: US 9,278,884 B2
(45) Date of Patent: Mar. 8, 2016

(54) METHOD OF PRINTING DECORATIONS ON SUBSTRATES

(71) Applicant: CORNING INCORPORATED, Corning, NY (US)

(72) Inventors: Tzu-Han Chen, Taichung (TW); Christopher Morton Lee, Corning, NY (US); Yongsheng Yan, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/513,407

(22) Filed: Oct. 14, 2014

(65) Prior Publication Data
US 2015/0103123 A1    Apr. 16, 2015

Related U.S. Application Data

(60) Provisional application No. 61/890,591, filed on Oct. 14, 2013.

(51) Int. Cl.
| | |
|---|---|
| C03C 17/00 | (2006.01) |
| B41J 11/00 | (2006.01) |
| B44F 3/00 | (2006.01) |
| B41M 5/24 | (2006.01) |
| B41M 7/00 | (2006.01) |

(52) U.S. Cl.
CPC ............ *C03C 17/002* (2013.01); *B41J 11/002* (2013.01); *B41M 5/24* (2013.01); *B41M 7/00* (2013.01); *B44F 3/00* (2013.01); *C03C 2218/119* (2013.01); *Y10T 428/24802* (2015.01); *Y10T 428/24926* (2015.01)

(58) Field of Classification Search
USPC .......................................... 347/101, 102, 105
See application file for complete search history.

(56) References Cited

U.S. PATENT DOCUMENTS

| | | | | |
|---|---|---|---|---|
| 4,093,771 A | * | 6/1978 | Fletcher et al. | 428/312.6 |
| 4,148,057 A | * | 4/1979 | Jesse | 347/232 |
| 5,314,522 A | * | 5/1994 | Kondo et al. | 65/31 |
| 5,370,913 A | * | 12/1994 | Lin | 428/13 |

(Continued)

FOREIGN PATENT DOCUMENTS

| | | |
|---|---|---|
| EP | 1 661 729 A2 | 5/2006 |
| GB | 2423053 A  * | 8/2006 |

(Continued)

OTHER PUBLICATIONS

Patent Cooperation Treaty International Notification of Transmittal of the International Search Report and The Written Opinion of the International Searching Authority, international application No. PCT/US2014/059995; mailing date Jan. 21, 2015, 10 pages.

*Primary Examiner* — Justin Seo
(74) *Attorney, Agent, or Firm* — John T. Haran

(57) ABSTRACT

A method of printing a decoration on a substrate includes applying an ink coating in a predetermined design on the substrate by inkjet printing. The ink coating is cured to form a cured ink coating, and a portion of the cured ink coating is trimmed. Residual ink particles generated by the trimming are cleaned off the substrate. A printed substrate includes a substrate and a decoration printed on the substrate. The decoration comprises at least one layer of an inkjet-printed ink coating free of a saw edge and having a thickness in a range from 1.5 μm to 5 μm.

19 Claims, 4 Drawing Sheets

(56) References Cited

U.S. PATENT DOCUMENTS

| | | | |
|---|---|---|---|
| 5,391,247 A * | 2/1995 | Kamen et al. | 156/233 |
| 5,449,426 A * | 9/1995 | Lin | 156/101 |
| 5,520,973 A * | 5/1996 | Kamen et al. | 428/35.7 |
| 5,562,951 A * | 10/1996 | Kamen | 427/493 |
| 5,678,481 A * | 10/1997 | Matsumoto et al. | 101/129 |
| 5,871,879 A * | 2/1999 | Verlinden et al. | 430/155 |
| 6,336,723 B1 * | 1/2002 | Nicolin | 347/105 |
| 6,487,386 B1 * | 11/2002 | Zimmer et al. | 399/297 |
| 6,599,576 B1 * | 7/2003 | Leach | 427/375 |
| 8,334,464 B2 * | 12/2012 | Edwards et al. | 174/260 |
| 8,643,260 B1 * | 2/2014 | Nemeth et al. | 313/117 |
| 2003/0085209 A1 * | 5/2003 | Lu | 219/121.69 |
| 2006/0141391 A1 | 6/2006 | Klein et al. | |
| 2006/0281334 A1 * | 12/2006 | Shin et al. | 438/780 |
| 2007/0014974 A1 * | 1/2007 | Vronsky | 428/209 |
| 2007/0065735 A1 * | 3/2007 | Kim | 430/7 |
| 2007/0108170 A1 * | 5/2007 | Costin et al. | 219/121.85 |
| 2007/0151178 A1 * | 7/2007 | Baikerikar et al. | 52/204.5 |
| 2008/0056951 A1 * | 3/2008 | Angros | 422/99 |
| 2009/0074997 A1 * | 3/2009 | Stark | 428/34 |
| 2010/0182686 A1 * | 7/2010 | Fukushima et al. | 359/463 |
| 2011/0126760 A1 * | 6/2011 | Daems | B41C 1/003 118/46 |
| 2012/0114921 A1 * | 5/2012 | Tsuda | 428/210 |

FOREIGN PATENT DOCUMENTS

| | | | | |
|---|---|---|---|---|
| JP | 57063263 A * | 4/1982 | | |
| JP | 02263739 A * | 10/1990 | | |
| JP | 06032922 A * | 2/1994 | | |
| JP | 2003034016 A * | 2/2003 | | |
| JP | 2003146679 A * | 5/2003 | | |
| JP | 2007168199 A * | 7/2007 | | |
| WO | 03/020527 A2 | 3/2003 | | |
| WO | 2005/022969 A2 | 3/2005 | | H05K 3/12 |
| WO | WO 2005051856 A2 * | 6/2005 | | |
| WO | 2008/069588 A1 | 6/2008 | | G02B 5/20 |
| WO | 2010/069749 | 6/2010 | | B41C 1/00 |
| WO | 2011/135398 A1 | 11/2011 | | |

* cited by examiner

METHOD OF PRINTING DECORATIONS ON SUBSTRATES

CROSS-REFERENCE TO RELATED APPLICATIONS

This application claims the benefit of priority under 35 U.S.C. §119 of U.S. Provisional Application Ser. No. 61/890,591 filed on Oct. 14, 2013 the content of which is relied upon and incorporated herein by reference in its entirety.

FIELD

The field relates to methods for printing decorations on substrates.

BACKGROUND

In recent years there has been an explosive growth in the use of glass as cover lens for consumer electronic devices with displays, such as mobile phones, tablets, and laptop computers. Part of the reason for this explosion is due to increased resistance of glass cover lenses to damage as a result of improvements in glass manufacturing processes and compositions. Glass cover lenses also improve the tactile feel of touch display operation while enhancing the aesthetic appeal of the devices.

Glass cover lenses typically have decorations printed on them for various reasons. One use of decorations is to mask the electronic components in the interior of the device from the view of the user. Another use of decorations is as logos that distinguish one product or brand from another. Decorations may also function as icons that indicate the status of the device or location for touch buttons. Decorations may also be used to simply enhance the aesthetic appeal of the device.

Decorations are typically in the form of ink coatings on the surfaces of the cover lenses. To be suitable for the uses mentioned above, the ink coating should have sufficient optical density to effectively block light and have no visible defects such as pinholes and saw edges. The ink coating should maintain adhesion and color under all environments where the device is expected to operate. The coating should also be compatible with other functions of the device, such as being thin enough not to interfere with assembly of the cover lens to the touch display module of the device and having high enough electrical resistance not to interfere with the function of the wireless antennae of the device.

The current state of the art is to print decorations on glass cover lenses using screen printing. For repeatedly printing the same design on a large number of cover lenses, screen printing is a mature process with relatively fast cycle time and low cost. However, there are some challenges with screen printing. The screen printing process is constantly changing due to evaporation of solvents in the ink during printing, wear in the screen emulsion and squeegee, and loss of tension in the screen. Any environmental contamination of the screen during printing would prevent ink from being deposited onto the substrate in the contaminated areas, causing pinhole defects. These pinholes can be reworked by manually applying ink at the defect location or by printing an additional layer of the same ink over the existing ink layer to cover the defects or by stripping all the ink from the glass part and reprinting. Each of the rework methods increases cost of fabrication and risk of other defects being introduced during the additional processing.

The screen printing process is also limited in the type of patterns that can be fabricated. When applying multiple colors on the cover lens, each color has to be printed in a separate layer, with each layer being cured in between applications. The multiple steps greatly lengthen the overall processing time, increase cost of fabrication with each additional layer printer, as well as increase the rate of yield loss due to extra processing. These challenges restrict the options available to device designers for design of the cover lens. To date, device cover lenses typically have no more than six different colors, and usually only two to four different colors. Each new color used in the decorative design requires a new ink. The required customization slows the response time from new design orders to finishing of cover lenses. Accordingly, there is a need for a method of applying decorations having a plurality of patterns and/or colors, without the drawbacks of traditional printing methods, such as screen printing.

SUMMARY

The subject matter in this disclosure relates to a method of printing a decoration on a surface of a substrate. In one aspect, the method uses a combination of inkjet printing and laser engraving to create a decoration on a substrate surface. The method produces decorations with highly defined features and affords design flexibilities that are not generally possible with traditional printing methods such as screen printing.

In one illustrative embodiment, a method of printing decorations on a substrate includes applying an ink coating in a predetermined design on the substrate by inkjet printing. The ink coating is then cured and the cured ink coating has a thickness in a range from 1.5 µm to 5 µm. The method includes laser engraving a portion of the cured ink coating with a laser having a wavelength to remove a portion of the cured ink coating, wherein the ink coating absorbs the wavelength or the laser more than the substrate.

Another illustrative embodiment is a printed substrate having a decoration printed thereon. The decoration can have at least one layer of an inkjet-printed ink coating free of a saw edge and having a thickness in a range from 1.5 µm to 5 µm One benefit of the method is reduction in wastage of ink, since the inkjet printer can dispense ink droplets directly onto desired locations on the surface of the substrate without use of transfer media such as screens. Another benefit is that the ink coating formed by inkjet printing can be relatively thin, for example in the range from about 1.5 µm to about 5 µm, which would facilitate downstream processes in consumer electronic display device assembly where coatings thicker than 5 µm can be a problem. The relatively thin ink coating can also minimize reduction in the compressive stress of the underlying substrate, for example when the substrate is strengthened glass because the substrate is subject to heat generated from the laser removing the ink coating for a shorter period of time.

Another benefit is that the desired design can be defined in a drawing file that can be uploaded to the inkjet printer for printing. Printing of a new design is then a simple matter of providing a drawing file containing a definition of the new design.

Another benefit is that several colors can be printed in one operation of the inkjet printer.

Another benefit is that the laser engraving process eliminates common printing defects from the inkjet printed design. The laser engraving can also form fine features in the inkjet printed design.

It is to be understood that both the foregoing general description and the following detailed description are exemplary and are intended to provide an overview or framework for understanding the nature and character of the disclosure as it is claimed. The accompanying drawings are included to provide a further understanding of the disclosure and are incorporated in and constitute a part of this specification. The drawings illustrate various embodiments of the disclosure and together with the description serve to explain the principles and operation of the disclosure.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
FIG. 1 shows a process for applying decorative coatings to surfaces of substrates, according to one or more embodiments.

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the disclosure. In addition, like or identical reference numerals may be used to identify common or similar elements.

FIG. 1 shows an illustrative process flow for printing a decoration on a surface of a substrate, such as glass substrates (e.g., cover lenses) and glass ceramic substrates (electronic device housing). The decoration may be composed of a single layer or a plurality of layers. At 10, the process involves inkjet printing a predetermined design on a surface of a substrate ("inkjet printing"). The inkjet printing results in an ink coating on the surface of the substrate, wherein the ink coating constitutes one layer of the decoration, or the sole layer if the decoration has only one layer. At 12, the ink coating is cured ("curing"). At 14, portions, such as the edges, of the cured ink coating are trimmed off by laser engraving ("laser engraving"). The laser engraving may also include cutting fine features in the ink coating. In some embodiments, at 16, the substrate is optionally cleaned off to remove residual ink particles left over from the laser engraving ("cleaning"). Optionally, at 18, additional ink coating layers can be printed on the surface ("additional printing") for additional layers of the decoration. The additional ink coating layer can be the same color or a different color as the first ink coating. At 20, any additional ink coating printed on the surface is cured ("additional curing"). Laser engraving 14, with or without cleaning 16, may be performed after additional printing 18. In one or more embodiments, additional printing 18 and laser engraving 14, with or without cleaning 16 may be repeated as many times as desired to achieve a design.

Figure 2:
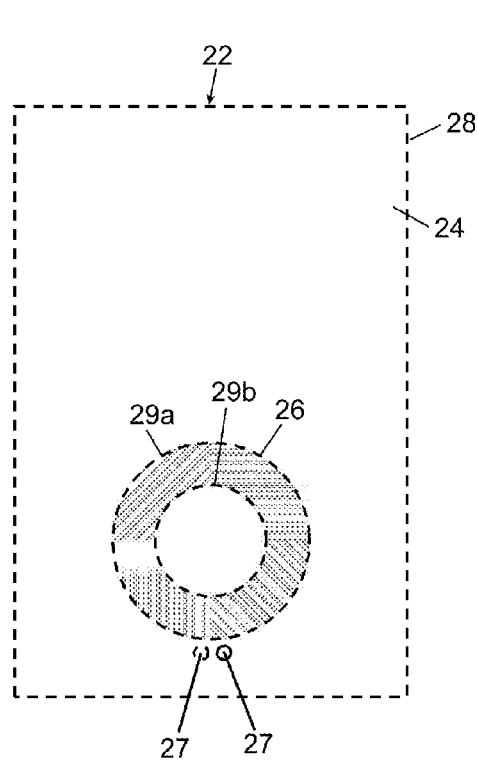
FIG. 2 is a representation of a design to be printed on a substrate, according to one or more embodiments.

Inkjet Printing (10 in FIG. 1)—FIG. 2 shows a representation of a decorative design 22 to be printed on a substrate. It should be clear that the design 22 shown in FIG. 2 is just for illustration purposes and is not intended to be limiting. The design 22 includes objects 24, 26. Object 24 corresponds to the surface of the substrate on which the design 22 is to be printed. Object 24 does not have a color or is transparent. Object 26 represents a geometrical shape to be printed on the surface of the substrate. The edges of the objects 24, 26 are indicated by construction lines 28, 29a, 29b, which will not appear in the printed design. For object 26, different shadings are used to indicate different colors. There may also be open features, in the ink coating, such as holes, in the object 26. Example open features 27 are shown in FIG. 2. The definition of the design 22 in terms of edges and colors of objects can be prepared using suitable graphics software and stored in a drawing file. The drawing file can be uploaded to an inkjet printer for printing on a surface of a substrate.

Figure 3:
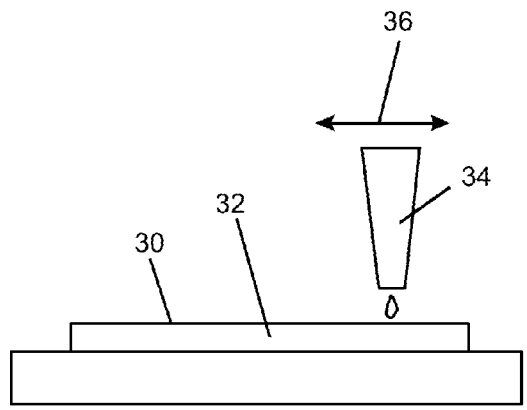
FIG. 3 shows inkjet apparatus for printing a design on a substrate, according to one or more embodiments.

FIG. 3 shows inkjet printing of the design 22 in FIG. 2 on a surface 30 of a substrate 32. In one embodiment, the substrate 32 is a glass substrate that has been optionally strengthened, for example by an ion-exchange process. In another embodiment, the substrate may include a glass ceramic substrate, which has optionally been strengthened, for example, chemically strengthened by an ion-exchange process. An inkjet print head 34 deposits droplets of ink, on the order of pico-liters, on the surface 30 at locations according to the desired design while moving back and forth along the surface 30, as indicated by the arrow 36. The inkjet print head 34 receives ink from cartridges that are not shown. Typically, the cartridges will have the inkjet printing colors cyan, magenta, yellow, and black. The cartridges may have additional colors for improved color resolution of the printed design.

Prior to inkjet printing on the surface 30, the substrate 32 may be cleaned to remove any surface contamination that may interfere with ink deposition and adhesion. Further, a primer may be applied to the surface 30 prior to deposition of the ink to assist in adhesion of the ink to the surface 30. The primer material should have good adhesion to the substrate material of the surface 30 as well as provide an adequate surface for the ink to adhere to. The inkjet printer used in printing the design can be any suitable digital inkjet flatbed printer. For example, ink prints have been successfully made on surfaces using a 3Mac digital inkjet flatbed printer and an Epson inkjet print head. The inkjet printing parameters, such as droplet size, dots per inch resolution, and numbers of channels printing, can be optimized to achieve the desired coating thickness and optical density while minimizing printing cycle time.

Figure 4:
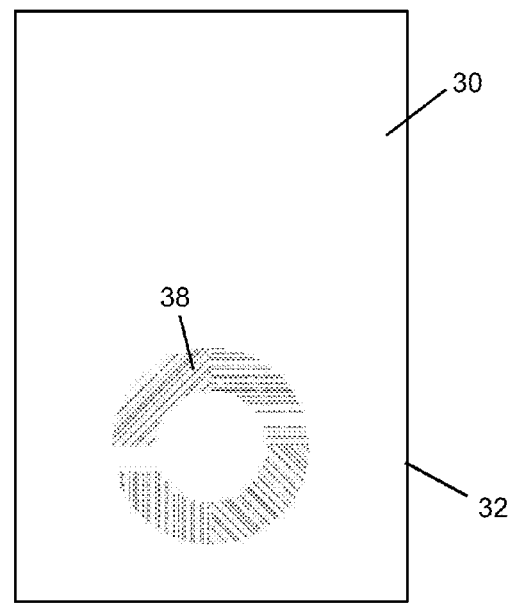
FIG. 4 shows a printed ink coating on a surface of a substrate, according to one or more embodiments.

When the inkjet print head 34 has finished the printing, there will be an ink coating on the surface 30. FIG. 4 shows such an ink coating 38. The shadings shown in FIG. 2 have been retained in FIG. 4 to indicate different colors of the coating. In one embodiment, the inkjet printing parameters are selected such that the ink coating has an optical density greater than about 3, greater than about 3.2, greater than about 3.4, greater than about 3.6. There is no particular upper limit to optical density. Optical density of 3 means that 99.9% of the light is blocked. The higher the optical density, the greater the percentage of light blocked. In one embodiment, the inkjet printing parameters are selected such that the ink coating has a thickness in a range from 1.5 μm to 5 μm, or 1.5 μm to 3 μm after curing. A 1.5 μm (cured and dried) coating from inkjet printing roughly corresponds to an optical density of 3, a 3 μm coating roughly corresponds to an optical density of 6, and a 5 μm coating roughly corresponds to an optical density of above 7. In general, the thicker the coating, the higher the corresponding optical density and the percentage of light block by the coating. Inkjet printing can control (cured and dried) thickness to within ±0.15 μm. Such a thin coating is more compatible with downstream processes in consumer electronic display assembly, which generally require ink thicknesses of 5 μm or less. One such downstream process is lamination of anti-reflective, anti-splitter, or ITO coated films on the substrate, where thinner ink coating reduces risk of air bubbles between film and substrate at the ink edge. Another process is a direct bonding assembly of the printed cover lens to the touch display module, in which the thinner coating reduces risk of air bubbles at the ink edge as well as the amount of the optically clear adhesive necessary to fill in the space created by the thickness of the decorative ink. A thin coating of 5 μm or less can also minimize damage to the underlying substrate when laser engraving is used to remove a portion of the inkjet coating. The thicker the inkjet coating, the more heat that is generated during laser engraving, thereby increasing the heat exposure to the underlying substrate, which in some circumstances can be damaged by heat exposure. One example of substrate that can be damaged by heat exposure is a strengthened glass substrate, for example an ion-exchanged, chemically strengthened glass substrate.

The inks used in the inkjet printing can be thermally-curable inks or UV-curable inks. In some embodiments, the inks can be resin-based that are thermally-curable and/or UV-curable. Thermally-curable inks are cured by baking at high temperatures, typically between 80° C. and 180° C. The baking time is typically between 30 minutes and 60 minutes. UV-curable inks are cured by UV light. UV curing is generally much faster than thermal curing and may be more suitable for mass production. On the other hand, where the substrate includes glass, several glass substrates can be cured at the same time so that curing time may not necessarily be a significant in determining which curing method to use. Suitable inks can be obtained commercially or specially formulated depending on the desired properties of the printed design Inks may include pigment paste, a mixture of inorganic and organic resins, a mixture of solvents, and additional additives such as flow promoters and degassing agents.

Curing (12 in FIG. 1)—The ink coating 38 is cured to complete cross-linking of the resins in the ink coating. Volatile components, if present in the ink coating, are driven off the ink coating during the curing, which will ensure adequate hardening of the coating and adhesion of the coating to the substrate surface. Depending on the type of ink used in printing of the ink coating, the curing can be achieved by exposure to UV light or by baking in convention and infrared ovens.

Figure 5A:
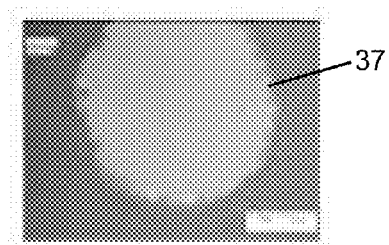
FIG. 5A shows an inkjet coating with a saw edge, according to one or more embodiments.
Figure 5B:
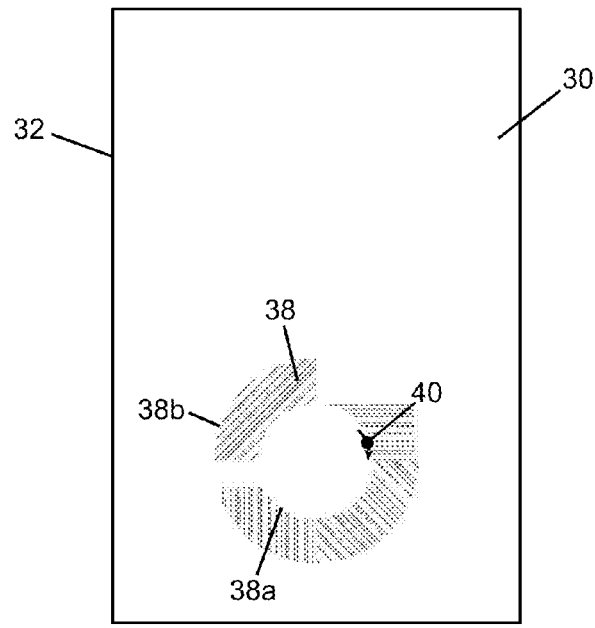
FIG. 5B illustrates laser trimming of edges of an ink coating on a substrate, according to one or more embodiments.

Laser Engraving (14 in FIG. 1)—Inkjet coatings typically have saw edges, which are due to overlapping of droplets at the edges of the coating. FIG. 5A is a microscopic image of print edge quality from an inkjet coating, where there is a saw edge 37, typically 50 to 100 μm in width. In one embodiment, laser engraving is used to trim off the saw edge. In laser engraving, a laser source is used to focus laser energy ("laser") on select portions of a material. In this case, the material will be the ink coating 38 (in FIG. 4) on the substrate surface. The laser energy can be focused to a small area of the ink coating, e.g., around the edges of the ink coating 38 where the saw-like printing defects are located. In some embodiments, the laser can have a spot size in a range from about 20 μm to 100 μm in diameter. In some embodiments, the spot size can be less than 100 μm in diameter or less than 60 μm in diameter. The laser engraver receives the definition of the design 22 (in FIG. 2). Color information of the design is not needed for laser engraving. As illustrated in FIG. 5B, the laser engraver will guide a laser 40 along the inner and outer edges 38a, 38b of the ink coating 38 using the received design definition. It will be understood that the laser engraver my guide the laser 40 on other portions of the ink coating 38 per the received design, as will be described below. The laser energy will burn a small amount of material from the inner and outer edges of the ink coating, e.g., 50 to 100 μm of width in the ink coating can be burned off, leaving the inner and outer edges crisp and free of any a saw edge.

Earlier on, it was indicated that the design 22 (in FIG. 2) could include one or more open features, such as holes 27 (in FIG. 2). Other examples of open features can include a line or a geometrical shapes or designs. Examples of geometrical shapes or designs include, but are not limited to, ovals, circles, quadrilaterals, curved shapes, etc. These open features may be too small for the inkjet printing to resolve. For example, the open feature(s) may exhibit an average longest cross-sectional dimension of less than or equal to 200 μm, less than or equal to 175 μm, less than or equal to 150 μm, less than or equal to 125 μm, less than or equal to 100 μm, less than or equal to 75 μm. In some embodiments the average longest cross-section dimension can be in a range between 75 μm and 200 μm, 75 μm and 175 μm, 75 μm and 150 μm, 75 μm and 125 μm, or 75 μm and 100 μm. The term "longest cross-sectional dimension," as used herein, refers to a particular dimension of an open feature that is parallel to the surface of the substrate. Thus, to clarify, when the open feature is circular, the longest cross-sectional dimension is the diameter of the open feature; when the open feature is oval-shaped, the longest cross-sectional dimension is the longest diameter of the oval-shaped feature parallel to the surface of the substrate; and when the open feature is irregularly-shaped, the longest cross-sectional dimension is the longest line between the two farthest opposing points on a perimeter that is parallel to the surface of the substrate for the irregularly-shaped open feature. When the open feature is a line, the longest cross-sectional dimension can be the width of the line. However, laser engraving can be used to cut such small open features in the ink coating while trimming the edges of the ink coating as described above. The laser engraving machine can obtain the information about the open features from the definition of the design that it receives.

The laser used in the laser engraving must be of a wavelength that is strongly absorbed by the ink coating 38 but not by the substrate 32. Thus the material of the substrate and the ink coating can be factors in determining the laser used. A laser that has a wavelength that is more strongly absorbed by ink coating 38 than substrate 32 can be advantageous in order to minimize or avoid damage to the underlying substrate. If substrate 32 absorbs the wavelength of the laser than it can compromise the optical properties (for example, transmittance and/or reflectance of the substrate) and mechanical properties (for example, mechanical strength of the substrate, resistance to cracking, and/or compressive stress) of substrate 32. The laser could be an infrared laser having a wavelength in a range from 700 nm to 1 mm, a green laser having a wavelength from 495 nm to 570 nm, or a UV laser having a wavelength from 10 nm to 380 nm, for example. In some embodiments, the laser power and or density can be adjusted or defocused to avoid damage to the underlying substrate. The Gaussian nature of power distribution within the laser spot can create a band of darkened, partially burned ink coating along the edge of the laser engraving pattern that still firmly adheres to the substrate surface. The thickness of this band can be minimized in some embodiments.

The thickness of the inkjet coating 38 can also be factored with finding a laser with a wavelength that is strongly absorbed by ink coating 38 but not by substrate 32. As discussed above, the thicker the inkjet coating 38, the longer the laser engraving process takes. As the inkjet coating 38 absorbs the laser, it can generate heat, and the heat can be conducted to the underlying substrate 32. If the underlying substrate 32 is heated sufficiently by conduction there can be degradation in the optical and mechanical properties of substrate 32. For example exposure to heat can make the glass prone to cracking or a reduction in strength. Also, when the substrate is a strengthened glass, such as a glass substrate chemically strengthened by ion-exchange, the compressive stress generated by the ion-exchange can be reduced due to stress relaxation. In some embodiments, if the properties of the substrate (for example, transparency, haze, compressive stress, strength, resistance to cracking, etc.) are measured before and after laser engraving, the properties of the substrate will be substantially the same. As used herein substantially the same means there is no statistically significant difference in the measurements of the property before and after laser engraving. A statistically significant difference exists when the p value is 5% or lower. The strength of the substrate can be measured using a ring-on-ring test using an Instron 5866 tester in accordance with ASTM C1499 (and its progeny), which is incorporated herein by reference in its entirety. The adhesion of the inkjet coating to the substrate can be measured using a Gardco cross-hatch adhesion kit in accordance with ASTM D3359 (and its progeny), which is incorporated herein by reference in its entirety. The compressive strength can be measured using an Orihara FSM 600 surface stress meter. The transparency can be measured using an Ocean Optic spectrometer. The haze can be measured using a BYK-Gardner haze meter.

Cleaning (16 in FIG. 1)—The residual ink particles left by the laser engraving process is cleaned off. The cleaning can be achieved in ultrasonic detergent baths or brush clean lines.

Additional Coatings (18 in FIG. 1)—Depending on the desired decoration function and properties, additional ink layers may be disposed on the substrate to complete the decorative pattern. In some embodiments, the additional ink layers can be the same color or a different color with respect to the ink layers already deposited on the substrate. In one or more embodiments, the additional ink layers may be applied by inkjet printing, as otherwise described herein. In other embodiments, the additional ink layers may be applied by other methods other than inkjet printing. For example, some decorative designs require opaque white background to fully realize the brilliance of color, which can be more effectively achieved by screen printing. Some ink features, such as metallic colors or IR/UV transparent coatings, cannot currently be achieved by inkjet printing. These additional features can be printed using existing industrialized processes, such as screen printing, pad printing, or film transfer. These other methods may be utilized after the inkjet printing 10, curing 12, laser engraving 14 and cleaning 16 and/or before or between any of the foregoing. In some instances, the substrate surface is coated with ink that forms a background of the design 22 and may be applied before inkjet printing 10.

Additional Curing (20 in FIG. 1)—Any additional ink coating layers printed on the glass substrate can be cured to complete cross-linking of resins in the ink coating. Any coatings applied by other method may also be cured.

Example

Designs were printed on surfaces of glass substrates by inkjet printing. The ink used for the printing was BM ink. A 4-channel 3Mac digital inkjet flatbed printer and an Epson inkjet print head were used for the printing. A primer was applied to the surfaces of some of the glass substrates prior to depositing ink on the glass surfaces by inkjet printing. The ink coatings formed on the glass substrates were thermally cured in batch convention and IR tunnel ovens and laser trimmed using a Keyence MD-V990WA IR laser integrated in a Geo-Wonder laser engraver machine. Finally, the glass substrates were cleaned through an ultrasonic cleaning line with detergent and deionized water baths.

Select samples were measured and tested. Ambios Profilometer was used for measuring ink thickness. Optical densitometer was used for measuring optical density. Gardco Cross-Hatch Adhesion Test Kit was used for testing adhesion of ink to glass. Terchey Test Chamber and Gardco Adhesion Test Kit were used for measuring performance under high temperature and high humidity and under exposure to thermal shock. Salty Vapor Chamber and Gardco Adhesion Test Kit were used for testing performance under exposure to salty vapor. Chemical Resistance Test Kit was used for testing chemical resistance of the ink coating.

Figure 6:
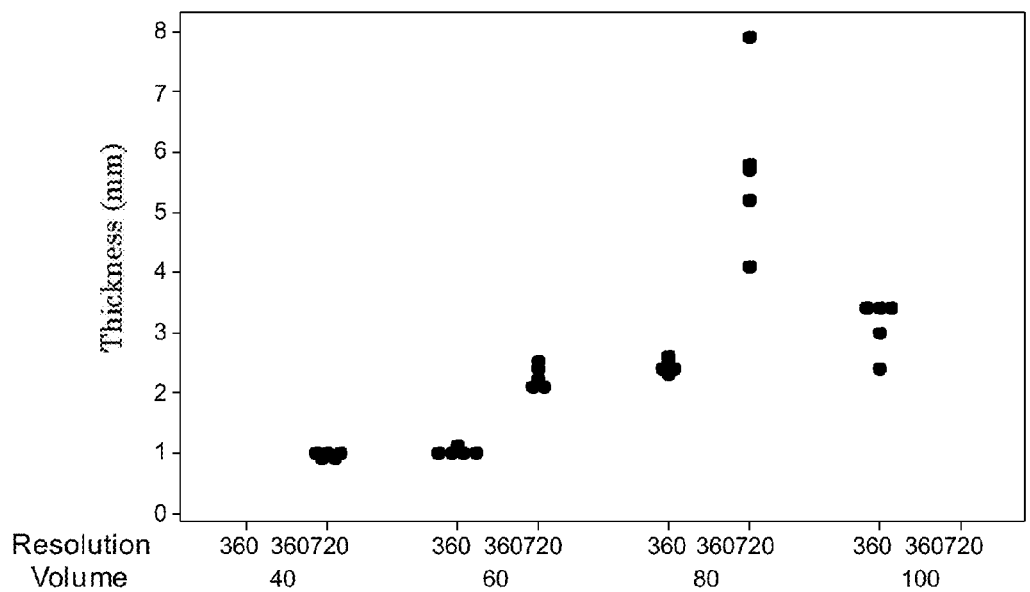
FIG. 6 shows a plot of coating thickness for substrates with inkjet coatings, according to one or more embodiments.
Figure 7:
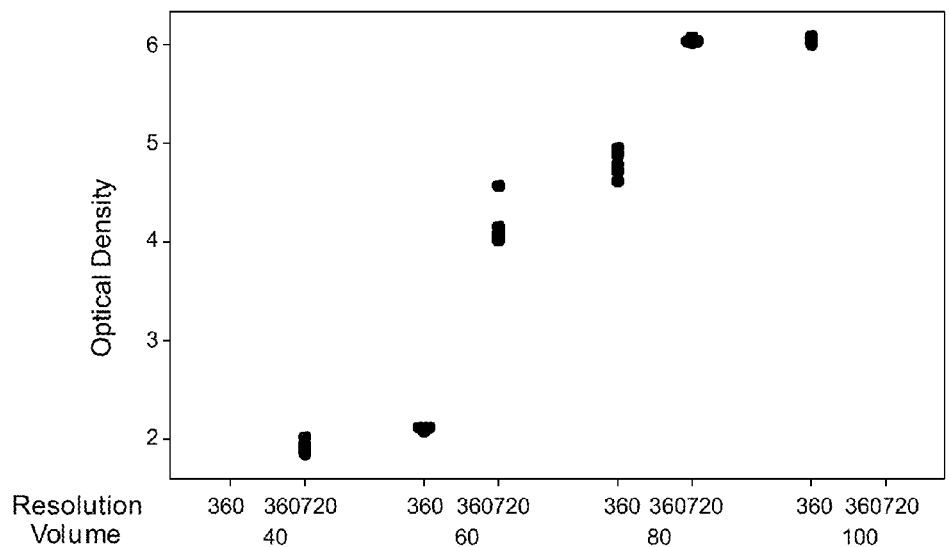
FIG. 7 shows a plot of optical density for the substrates of FIG. 6.
Figure 8:
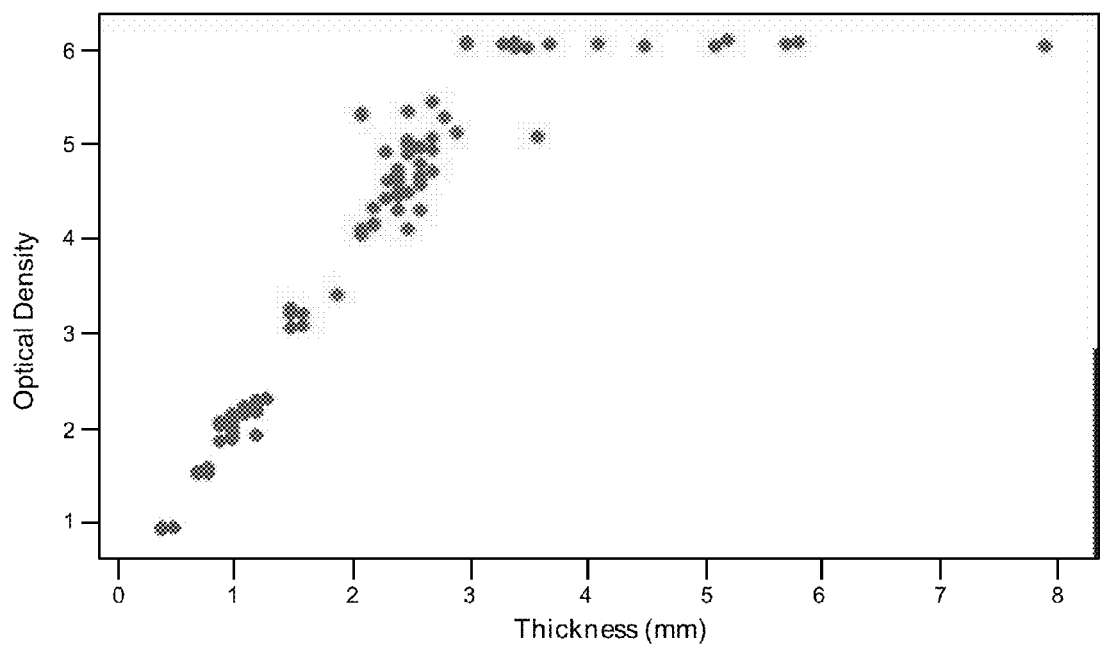
FIG. 8 shows a relationship between optical density and coating thickness for substrates with inkjet coatings, according to one or more embodiments.

FIG. 6 shows a plot of coating thickness for the selected samples. FIG. 7 shows the optical density for the selected samples. FIG. 8 shows a relationship between optical density and coating thickness for cured inkjet printed coatings. FIG. 8 shows that optical density scales linearly with coating thickness. The limit of the optical densitometer used in the measurement was 6. Therefore, the optical densitometer could not measure the actual optical density value at thicknesses greater than 3 µm. To achieve optical density greater than 3, the coating thickness will need to be greater than 1.5 µm. For the example above, a cured ink coating thickness between 2 and 3 µm can be achieved by printing at 360×360 dpi and 80% droplet volume or 360×720 dpi and 40% droplet volume. "Droplet volume" is the volume of each of the tiny drops (droplets) jetting from the print head during printing, typically in pico-liter range. When there is excess ink printed, at denser resolution and/or large droplet volumes, surface tension driven ink flows cause non-uniformities in coating thickness and optical density.

Figure 9:
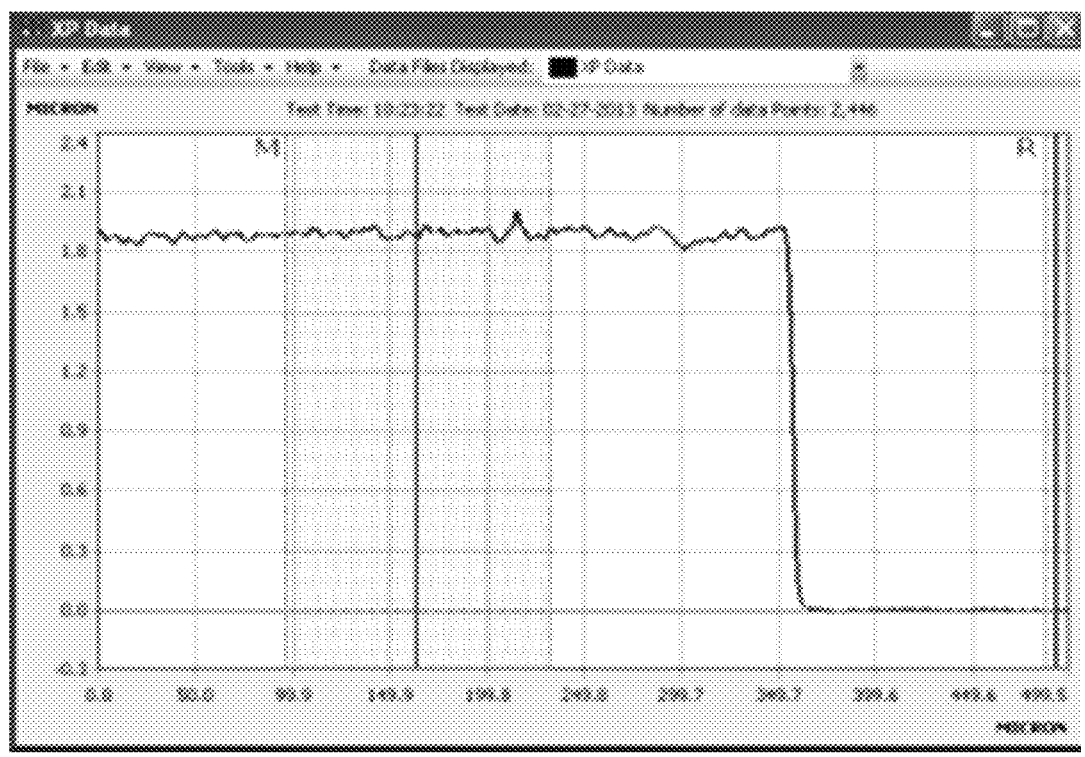
FIG. 9 shows a typical ink coating thickness profile from inkjet printing, according to one or more embodiments.
Figure 10:
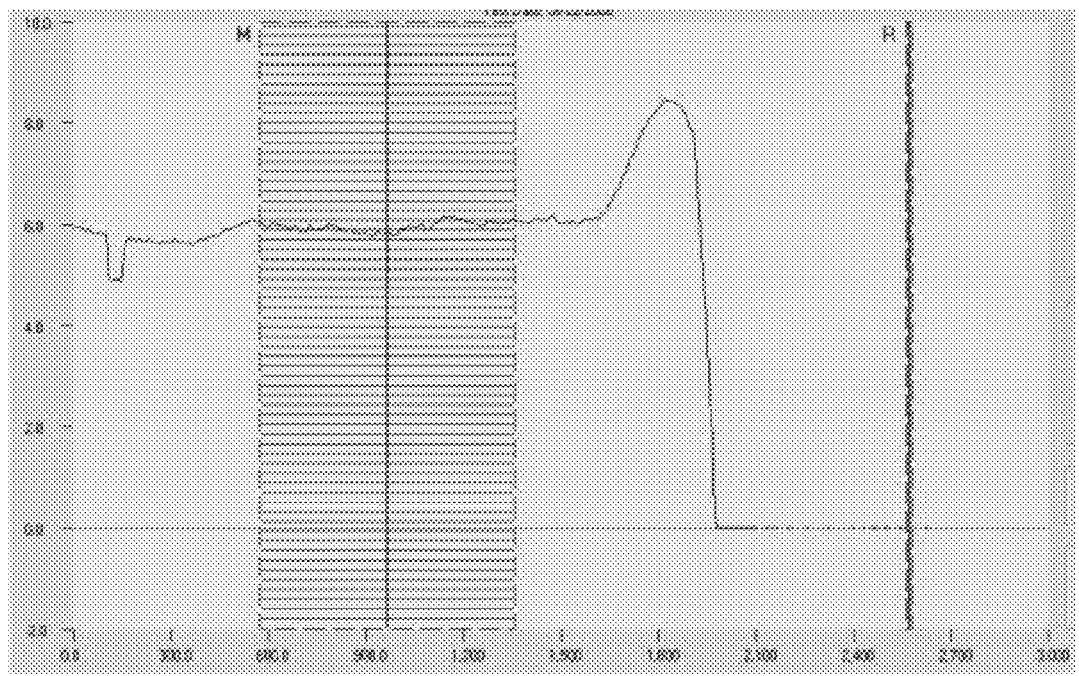
FIG. 10 shows a typical coating thickness profile from screen printing.

FIG. 9 shows the typical coating thickness profile from inkjet printing, with uniformly low thickness and no edge bump. FIG. 10 shows the typical coating thickness profile from screen printing, for comparison purposes. The average coating thickness for the screen printing is much higher than that for inkjet printing, and with screen printing there is a thicker bump along the edge of the printed pattern, due to presence of the emulsion.

The results of the testing showed that the inkjet printing and laser engraving processes are viable for consumer electronic display cover lens application. The results also show that for the BM ink, the requisite ink adhesion was not achieved without the addition of a primer to the surface of the glass substrate prior to inkjet printing.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

The invention claimed is:

1. A method of printing a decoration, comprising:
   applying an ink coating in a predetermined design on a surface of a substrate by inkjet printing;
   curing the ink coating to form a cured ink coating, wherein the ink coating has a thickness in a range from 1.5 µm to 5 µm after curing;
   laser engraving at least a portion of an edge of the cured ink coating by a laser having a wavelength to remove a saw edge inkjet printing defect of the cured ink coating that deviates from the predetermined design, wherein the ink coating absorbs the wavelength of the laser more than the substrate;
   wherein the laser engraving exposes at least a portion of the substrate that was covered by the cured ink coating; and
   wherein the strength, transparency or haze of the substrate is substantially the same after the laser engraving in comparison to prior to the laser engraving.

2. The method of claim 1, further comprising applying a primer to the surface of the substrate prior to the inkjet printing.

3. The method of claim 1, wherein laser engraving further comprises cutting an open feature in the cured ink coating.

4. The method of claim 3, wherein the feature has a size less than 100 µm.

5. The method of claim 3, wherein removing the saw edge inkjet printing defect and cutting an open feature in the cured ink coating occurs in a single laser engraving process.

6. The method of claim 5, wherein the feature has a size less than 100 µm.

7. The method of claim 1, wherein the ink coating has an optical density greater than 3 after curing.

8. The method of claim 1, wherein laser engraving comprises focusing an infrared laser source or green laser source on the cured ink coating.

9. The method of claim 1, wherein the substrate comprises a glass substrate or a glass ceramic substrate.

10. The method of claim 9, wherein the glass substrate comprises a chemically strengthened glass.

11. The method of claim 10, wherein the chemically strengthened glass is an ion-exchanged glass.

12. The method of claim 9, wherein the glass ceramic substrate comprises a chemically-strengthened glass.

13. The method of claim 12, wherein the chemically strengthened glass ceramic is an ion-exchanged glass ceramic.

14. The method of claim 1, further comprising disposing an additional layer of ink on the substrate by one of ink jet printing, screen printing, pad printing, or film transfer.

15. The method of claim 14, wherein the additional layer of ink is a different color than a layer of ink already disposed on the substrate.

16. The method of claim 1, further comprising cleaning off residual ink particles generated from the laser engraving of the edge portion of the cured ink coating.

17. The method of claim 1, wherein the strength of the substrate is substantially the same after the laser engraving in comparison to prior to the laser engraving.

18. The method of claim 1, wherein the transparency of the substrate is substantially the same after the laser engraving in comparison to prior to the laser engraving.

19. The method of claim 1, wherein the haze of the substrate is substantially the same after the laser engraving in comparison to prior to the laser engraving.

* * * * *